March 31, 1925.
R. C. STEVENS
VALVE MECHANISM
Filed March 8, 1924
1,531,523
2 Sheets-Sheet 1
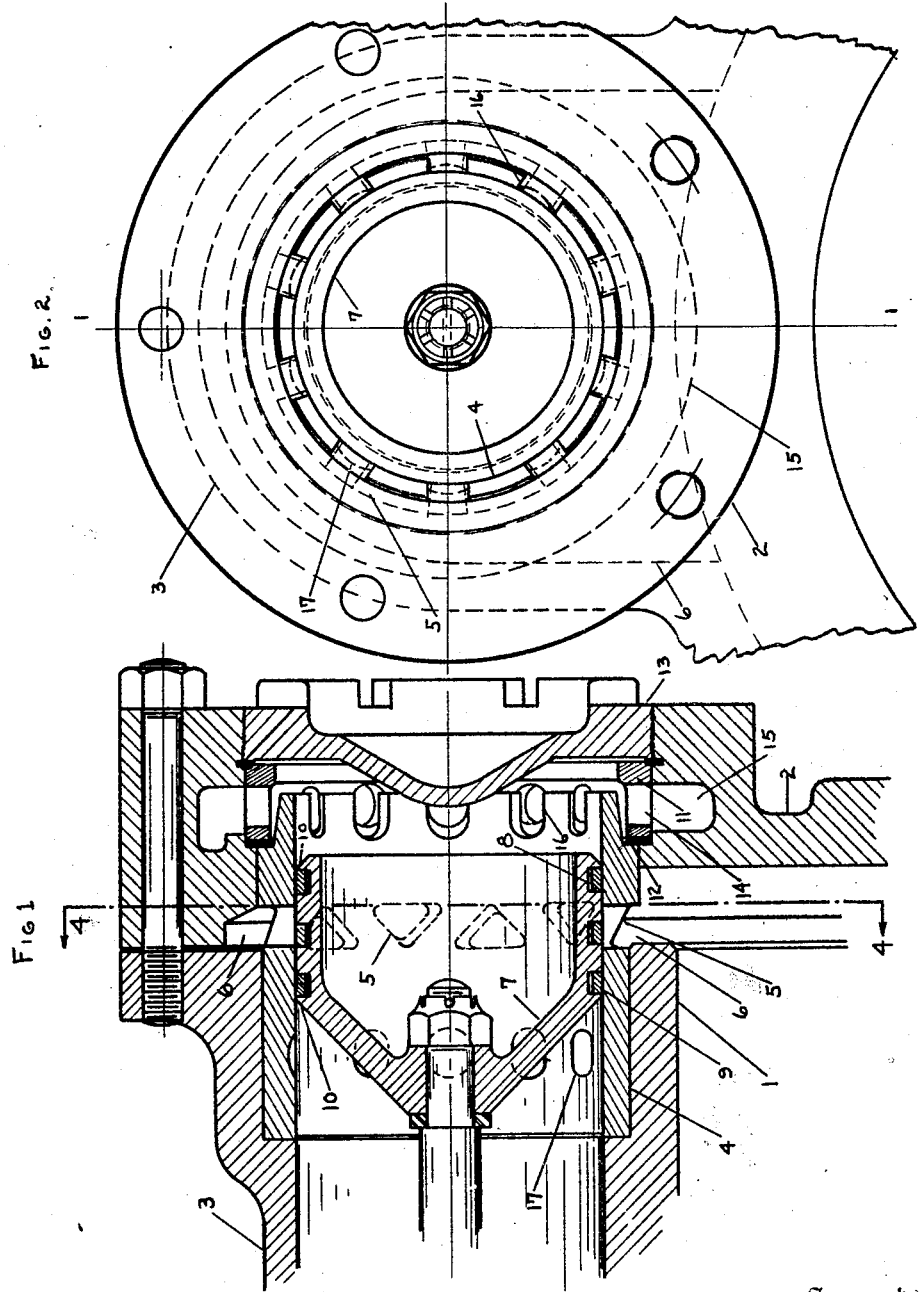
Inventor
Robert C. Stevens
By
Attorney March 31, 1925. 1,531,523
R. C. STEVENS
VALVE MECHANISM
Filed March 8, 1924 2 Sheets-Sheet 2
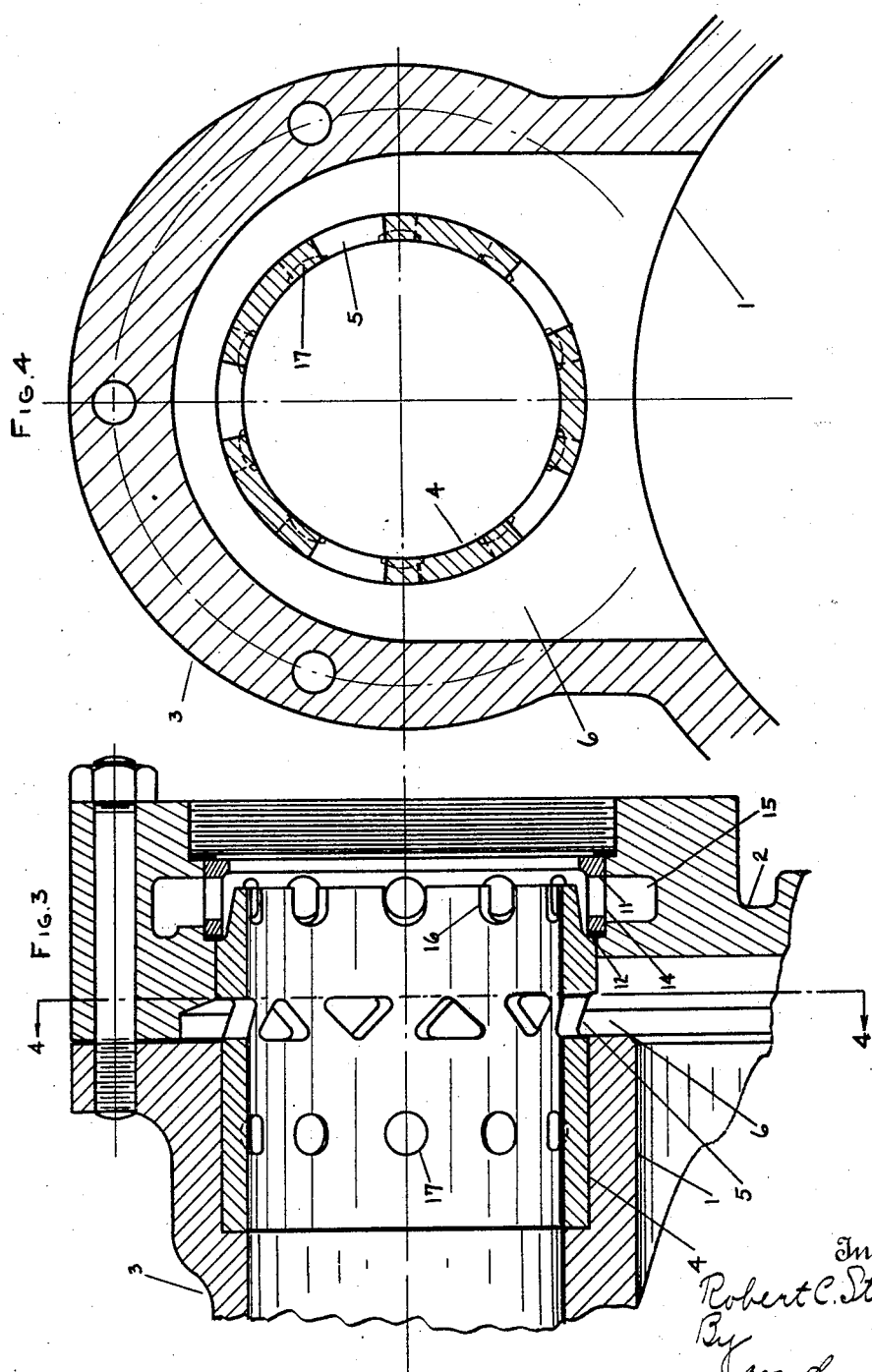

Patented Mar. 31, 1925.

1,531,523

UNITED STATES PATENT OFFICE.

ROBERT C. STEVENS, OF ERIE, PENNSYLVANIA.

VALVE MECHANISM.

Application filed March 8, 1924. Serial No. 697,971.

*To all whom it may concern:*

Be it known that I, ROBERT C. STEVENS, a citizen of the United States, residing at Erie, in the county of Erie and State of Pennsylvania, have invented new and useful Improvements in a Valve Mechanism, of which the following is a specification.

This invention is designed to improve piston valves. Such valves are of advantage because of their cheapness and the ease with which they may be balanced. The disadvantages incident to the use of the valve arise from the difficulty in keeping such valves tight. In an attempt to make such valves tight packing rings have been used but where there is a variation in the travel of the valve the valve in its shorter travel wears the valve seats to a greater extent than the portions of the seat at the ends of the travel, thus forming shoulders, as it were, which must be traversed by the rings. In plain valve construction or piston valves where no rings are used it is possible to obviate this difficulty by having the valve reach the end of the seat with its short travel so that any added travel on the valve is beyond the end of the seat and thus avoids the formation of such shoulders and uneven surfaces. I have discovered that this uneven wear may be largely avoided by reducing the area of the seating surface at the ends of the seat. Thus a sufficient amount of surface is provided to maintain the rings in position but the reduced surface results in a variation in wear with relation to the full surface preventing an uneven wearing of the seating surfaces. Other features of the invention will appear from the specification and claims.

The invention is illustrated in the accompanying drawings as follows:—

Fig. 1 shows a central section through the valve on the line 1—1 in Fig. 2.

Fig. 2 an end view of the valve chest with the cover removed.

Fig. 3 a section similar to Fig. 1 with the valve removed to show the seat.

Fig. 4 a section on the line 4—4 in Figs. 1 and 3.

1 marks the cylinder, 2 the cylinder head, 3 the steam chest, 4 a valve bushing in the steam chest, 5 ports through the bushing, 6 a port leading from the ports 5 to the cylinder, 7 a piston valve arranged in the bushing, 8 packing ring grooves arranged in the valve, and 9 packing rings in the grooves.

These parts so far as described are similar to structures of this kind heretofore made. I prefer to bevel the ends of the valves at 10 bringing them to an edge at the outer valve rings so that the cut-off edge of the valve is formed by the ring.

The bushing 4 is secured by a retainer 11 operating against a shoulder 12 on the bushing and being clamped in place by a bonnet or cover 13. The retaining ring has a series of perforations 14 leading to a passage 15 arranged in the cylinder head.

A number of peripheral slots 16 are arranged in the end of the bushing and corresponding depressions 17 are arranged in the opposite end of the bushing. These reduce the area of the seating surface and are arranged relatively to the valve travel so that at the shortest travel of the valve the valve over-travels the depressions 17 and the depressions formed by the slots. The depressions are sufficiently long so that the valve at its longest travel does not pass off the bushing or beyond the depressions.

The depressions are preferably staggered with relation to the port openings 5 in the bushing, this resulting in a more uniform wear on the packing rings.

The ends of the ports 5 are preferably in annular alinement and the bridges between the ports are inclined to the ends, thus providing a more continuous surface as a support for the rings.

With this structure a piston valve will remain steam-tight for an extended period and the wearing of uneven surfaces due to variations of travel of the valve is very largely if not entirely, avoided.

What I claim as new is:—

1. In a valve mechanism, the combination of a reciprocating piston valve; packing rings on said valve; and an annular ported seat for said valve, said seat having depressions over-travelled by the valve at the end of its stroke.

2. In a valve mechanism, the combination of a reciprocating piston valve; packing rings on said valve; and an annular ported seat for said valve, said seat having depressions over-travelled by the valve at both ends of its stroke.

3. In a valve mechanism, the combination of a reciprocating piston valve; packing rings on the valve; and an annular seat for said valve, said seat having an annular series of ports, and depressions over-travelled by the valve at an end of its stroke, said depressions being staggered with relation to the ports.

4. In a valve mechanism, the combination of a reciprocating piston valve; packing rings on the valve; and an annular seat for said valve, said seat having an annular series of ports, and depressions at each end over-travelled by the valve at each end of its stroke, said depressions being in staggered relation with the ports.

5. In a valve mechanism, the combination of a reciprocating piston valve; packing rings on the valve; and an annular seat for said valve, said seat having an annular series of ports, the ends of said ports being in alinement and the bridges between said ports being inclined to the ends, said seat being also provided with depressions over-travelled by the valve at an end of its stroke.

6. In a valve mechanism, the combination of a reciprocating piston valve; packing rings on the valve; and an annular seat for said valve, said seat having an annular series of ports, the ends of said ports being in alinement and the bridges between said ports being inclined to the ends, said seat being also provided with depressions over-travelled by the valve at an end of its stroke, said depressions being staggered with relation to said ports.

In testimony whereof I have hereunto set my hand.

ROBERT C. STEVENS.